United States Patent
Takahashi et al.

(10) Patent No.: US 9,550,145 B2
(45) Date of Patent: Jan. 24, 2017

(54) EXHAUST GAS TREATMENT APPARATUS, SHIP, AND EXHAUST GAS TREATMENT METHOD

(71) Applicant: FUJI ELECTRIC CO., LTD., Kawasaki-shi (JP)

(72) Inventors: Kuniyuki Takahashi, Hino (JP); Tadashi Komatsu, Tokyo (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 4 days.

(21) Appl. No.: 14/680,729

(22) Filed: Apr. 7, 2015

(65) Prior Publication Data

US 2015/0209723 A1 Jul. 30, 2015

Related U.S. Application Data

(63) Continuation of application No. PCT/JP2014/060177, filed on Apr. 8, 2014.

(30) Foreign Application Priority Data

Apr. 17, 2013 (JP) ................................. 2013-086290

(51) Int. Cl.
  *F01N 3/08* (2006.01)
  *B01D 53/50* (2006.01)
  (Continued)

(52) U.S. Cl.
  CPC ............. *B01D 53/504* (2013.01); *B01D 53/18* (2013.01); *B01D 53/346* (2013.01); *B01D 53/78* (2013.01);
  (Continued)

(58) Field of Classification Search
  CPC ............. F01N 3/085; B01D 2259/4566; B01D 2258/012; B01D 2257/302; B01D 2252/1035; B01D 53/92; B01D 53/78; B01D 53/77; B01D 53/501; B01D 53/38; B01D 53/1481; B01D 53/1406; B63B 17/06; B63B 2209/00
  See application file for complete search history.

(56) References Cited

U.S. PATENT DOCUMENTS 3,693,557 A     9/1972   Makuch
3,781,407 A  *  12/1973  Kamijo .................. A62C 3/002
                                                    220/88.3
(Continued)

FOREIGN PATENT DOCUMENTS

CN         202191840 U     4/2012
DE   10 2010 042 419 A1 *  4/2012  ......... B01D 46/0036
(Continued)

OTHER PUBLICATIONS

Chinese Office Action with translation dated Oct. 27, 2015.
Japanese Office Action dated Mar. 1, 2016 and its partial translation.

*Primary Examiner* — Timothy Vanoy
(74) *Attorney, Agent, or Firm* — Rabin & Berdo, P.C.

(57) ABSTRACT

An exhaust gas treatment apparatus and method that absorbs gas by bringing the gas and a liquid into contact with each other has a plurality of scrubbers that each include an absorption tower main unit in which an internal space is formed. A spray apparatus sprays liquid in a predetermined vertical region of the internal space, and a gas supply apparatus introduces the gas into the absorption tower main unit. A number of first passages branch from a pipe supplying the liquid to the exhaust gas treatment apparatus and are connected to the spray apparatuses of the scrubbers. A number of second passages branch from a pipe supplying the gas to the exhaust gas treatment apparatus and are connected to the gas supply apparatuses of the scrubbers.

20 Claims, 6 Drawing Sheets

(51) Int. Cl.
    *B01D 53/34*     (2006.01)
    *B63H 21/32*     (2006.01)
    *B01D 53/78*     (2006.01)
    *B63B 17/06*     (2006.01)
    *B01D 53/18*     (2006.01)

(52) U.S. Cl.
    CPC ......... B63H 21/32 (2013.01); *B01D 2251/304* (2013.01); *B01D 2252/10* (2013.01); *B01D 2252/1035* (2013.01); *B01D 2258/0283* (2013.01); *B01D 2259/4566* (2013.01)

(56) References Cited

U.S. PATENT DOCUMENTS

| | | | |
|---|---|---|---|
| 3,897,540 | A | 7/1975 | Onnen |
| 4,164,547 | A | 8/1979 | Simko |
| 8,349,055 | B2 * | 1/2013 | Kaisko ................... B01D 53/92 |
| | | | 95/149 |
| 2010/0224070 | A1 * | 9/2010 | Patterson ............ B01D 53/1425 |
| | | | 96/181 |
| 2012/0312166 | A1 * | 12/2012 | Theis ..................... B01D 47/06 |
| | | | 95/219 |
| 2014/0060323 | A1 * | 3/2014 | Liu ........................ B01D 47/12 |
| | | | 95/8 |
| 2015/0174527 | A1 * | 6/2015 | Takahashi ............... B05B 1/202 |
| | | | 422/168 |
| 2015/0238897 | A1 * | 8/2015 | Molgaard .............. B01D 53/78 |
| | | | 423/212 |
| 2016/0051927 | A1 * | 2/2016 | Panziera .............. B01D 53/228 |
| | | | 95/45 |

FOREIGN PATENT DOCUMENTS

| | | |
|---|---|---|
| JP | S47-21369 A | 10/1972 |
| JP | H09-192447 A | 7/1997 |
| JP | 3073972 B2 | 8/2000 |
| JP | 2002-136829 A | 5/2002 |
| JP | 2009-240908 A | 10/2009 |
| JP | 2014-200735 A | 10/2014 |

* cited by examiner

EXHAUST GAS TREATMENT APPARATUS, SHIP, AND EXHAUST GAS TREATMENT METHOD

This application is a continuation under 35 U.S.C. 120 of International Application PCT/JP2014/060177 having the International Filing Date of Apr. 8, 2014 which claims foreign prior benefits of Japanese Patent Application No. 2013-086290 filed on Apr. 17, 2013. The subject matter disclosed in these identified applications is incorporated herein by reference.

BACKGROUND

Technical Field

The present invention relates to an exhaust gas treatment apparatus, a ship and an exhaust gas treatment method for removing toxic substances (mainly sulfur oxide ($SO_x$)).

Background Art

As a removal apparatus for removing such toxic substances as $SO_x$, nitrogen oxide ($NO_x$) and particulate matter (PM) in exhaust gas, an exhaust gas treatment apparatus using a cyclone scrubber is known (e.g. see Patent Document 1). An exhaust gas desulfurization apparatus according to Patent Document 1 absorbs or collects dust by allowing gas, which circles and rises from the bottom of a cylindrical tower, to contact liquid that is sprayed in a radius direction of the tower through spray nozzles disposed with appropriate intervals on a spray pipe, which is installed vertically on the center axis of the tower.

Patent Document 1: Japanese Patent No. 3073972

SUMMARY OF THE INVENTION

In a cyclone scrubber, the exhaust gas and the absorbing solution must be separated using the centrifugal force of the exhaust gas flow, to stop the absorbing solution from splashing through the exhaust gas outlet of the scrubber. The centrifugal force here is given by the following Expression (1).

$$F = mv_2/R \tag{1}$$

On the other hand, in the cyclone scrubber, the rate of removing the toxic substance from the exhaust gas is higher as the gas velocity in the vertical direction is slower. To decrease the gas velocity, it is necessary to increase the cross-sectional area of the scrubber. If the scrubber has a cylindrical shape, the cross-sectional area of the scrubber can be increased by increasing the diameter thereof.

In Expression (1), if the diameter is increased with fixing the height of the scrubber, the centrifugal force F decreases in inverse proportion to the radius R. And if the radius R is increased, the distance from the spray nozzle to the inner wall face of the scrubber increases, therefore it is more likely that the absorbing solution sprayed from the spray nozzle will not reach the inner wall face of the scrubber, and sprays through the exhaust gas outlet. As a result, it becomes necessary to set an upper limit value of the diameter for the cyclone scrubber depending on the conditions.

Further, the cyclone scrubber must be designed so that the assumed maximum flow rate of the exhaust gas can be treated. On the other hand, the amount of exhaust gas that is treated by the cyclone scrubber changes according to the changes in the load on the exhaust gas generation apparatus. For example, if the amount of the absorbing solution that can treat the maximum flow rate is sprayed in the cyclone scrubber when the load on the exhaust gas generation apparatus has decreased and the amount of exhaust gas to be treated has decreased, then the capacity [of the cyclone scrubber] becomes excessive, which generates unnecessary expenses since absorbing solution and power are wasted. Hence it is desirable for the cyclone scrubber to change the amount of the absorbing solution according to the change in the load.

In a cyclone scrubber, however, a number of spray nozzles to spray the absorbing solution is unchanged, therefore if the amount of the absorbing solution is decreased, the injection pressure drops and the spray properties worsen. This means that it is necessary to configure the cyclone scrubber so that appropriate spray properties are maintained, regardless the increase/decrease in the amount of exhaust gas to be treated.

Moreover, to treat exhaust gas having a large flow rate by using one scrubber that has a cylindrical shape, the diameter of the scrubber must be large, which makes installability more difficult. In particular, when the scrubber is installed in a location where the installation space is limited, such as onboard a ship, the layout of the installation is a problem.

With the foregoing in view, it is an object of the present invention to provide an exhaust gas treatment apparatus, a ship, and an exhaust gas treatment method that allows treating exhaust gas having a high flow rate, while limiting the diameter of a scrubber.

In one aspect, the present invention provides an exhaust gas treatment apparatus that processes exhaust gas by bringing liquid into contact, including: a plurality of scrubbers that include an absorption tower main unit, a spray apparatus that sprays liquid in the absorption tower main unit, and a gas supply apparatus that supplies exhaust gas into the absorption tower main unit, a plurality of first passages that branch from a pipe supplying the liquid to the exhaust gas treatment apparatus, and that is connected to the spray apparatus of each of the plurality of scrubbers, and a plurality of second passages that branch from a pipe supplying the exhaust gas to the exhaust gas treatment apparatus, and that is connected to the gas supply apparatus of each of the plurality of scrubbers.

According to the exhaust gas treatment apparatus, a plurality of scrubbers are installed, and the exhaust gas to be treated can be distributed to the plurality of scrubbers, and therefore the removal rate of the toxic substances in the exhaust gas can be improved in the entire exhaust gas treatment apparatus, while keeping the diameter of each scrubber to a predetermined value or less. Moreover, since the diameter of each scrubber can be a predetermined value or less, splashing of the absorbing solution can be suppressed.

Further, the installation locations of the scrubbers in the exhaust gas treatment apparatus can be distributed, hence the exhaust gas treatment apparatus can be installed in a location that is subject to limited installation space, such as in an engine room or on the deck of a ship, and installability of the exhaust gas treatment apparatus can be improved.

In this exhaust gas treatment apparatus, it is preferable that a switching valve is disposed in each of the plurality of first passages and the plurality of second passages, and this exhaust gas treatment apparatus further includes a controller that controls switching of the switching valves.

In this case, the liquid to be supplied to the spray apparatus of the scrubber and the gas to be introduced to the scrubber can be controlled by controlling the switching of the switching valves, hence the number of scrubbers to be operated can be changed depending on the combustion devices that generate exhaust gas and the changes in the engine load. In other words, the number of scrubbers to be operated can be adjusted according to the amount of exhaust gas to be or being treated, hence an energy saving operation without waste is implemented. (Herein, exhaust gas to be treated and exhaust gas being treated are used interchangeably and corresponds to the amount of exhaust gas flowing into the apparatus).

In this exhaust gas treatment apparatus, it is preferable that the controller controls the switching of the switching valves and controls a total number of scrubbers to be operated, based on an engine load instruction.

In this case, the controller can control an amount of the liquid being sprayed in the plurality of scrubbers according to the changes in the engine load or the like, hence appropriate spray properties can be maintained.

In this exhaust gas treatment apparatus, it is preferable that the controller controls the total number of the scrubbers to be operated according to at least one of the load factor of the engine and the amount of exhaust gas to be treated.

In this exhaust gas treatment apparatus, it is preferable that the controller controls an amount of the liquid being sprayed in the plurality of scrubbers according to at least one of the load factor of the engine and the amount of exhaust gas to be treated.

In this exhaust gas treatment apparatus, it is preferable that the plurality of scrubbers are cyclone scrubbers, and the diameter of each cyclone scrubber is a predetermined value or less.

In this exhaust gas treatment apparatus, it is preferable that the absorption tower main unit has a peripheral wall portion, a liquid returning member is disposed on the peripheral wall portion, and the liquid returning member includes: a turn-back surface portion that circularly protrudes from the peripheral wall portion toward the center axis; a bent piece that is bent down from the edge of the turn-back surface portion on the center axis side; a liquid collecting wall that protrudes upward from the edge of the turn-back surface portion to form a liquid collecting portion; and an opening that allows the liquid collected in the liquid collecting portion to fall through.

In this exhaust gas treatment apparatus, it is preferable that the opening is disposed in a position where a gas velocity is slower, compared with an area near the peripheral wall portion.

In this exhaust gas treatment apparatus, it is preferable that the liquid is seawater, this exhaust gas treatment apparatus further including: a seawater tank that stores the seawater contacted with the exhaust gas as circulating seawater; and an alkali pump that supplies an alkali agent to the circulating seawater which is supplied from the seawater tank to the spray apparatus.

A ship, according to the present invention, has any one of the exhaust gas treatment apparatuses described above on board.

In one aspect, an exhaust gas treatment method of the present invention has: distributing exhaust gas to a plurality of scrubbers, distributing liquid to the plurality of scrubbers, controlling operation of the plurality of scrubbers, based on an engine load instruction, and a step of removing toxic substances in the exhaust gas by bringing the exhaust gas and the liquid into contact with each other, the exhaust gas and the liquid being supplied to the plurality of scrubbers respectively.

According to the present invention, the exhaust gas treatment apparatus can allow treating exhaust gas having a high flow rate while limiting the diameter of each absorption tower.

DETAILED DESCRIPTION

Embodiments of the present invention will now be described in detail with reference to the accompanying drawings.

Figure 1:
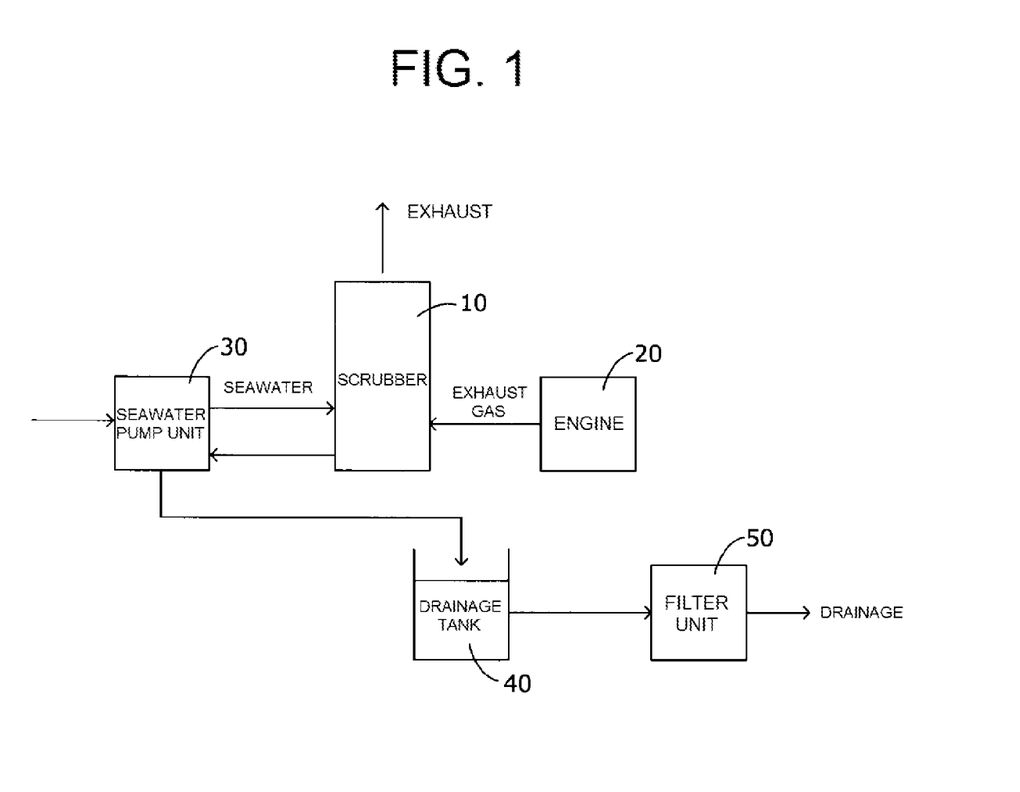
FIG. 1 is a diagram depicting an exhaust gas treatment system centering around a scrubber according to the present embodiment.

FIG. 1 is a diagram depicting an exhaust gas treatment system centering around a scrubber according to the present embodiment. A system, which removes sulfur dioxide ($SO_2$) contained in exhaust gas discharged from an engine of a ship, is considered as the exhaust gas treatment system according to the present embodiment. The discharge gas treatment system according to the present embodiment, however, is not limited to this, but can be applied to the treatment of various exhaust gases constituting such substances as nitrogen oxide and sulfur oxide.

As illustrated in FIG. 1, the exhaust gas treatment system is constituted mainly by a scrubber 10 to which exhaust gas is supplied from the engine 20, a seawater pump unit 30 that includes a seawater pressure pump and a seawater drain pump, a drainage tank 40, and a filter unit 50 that filters drainage.

The exhaust gas discharged from the engine 20 is introduced to the scrubber 10. The exhaust gas includes 50 to 1500 ppm of sulfur dioxide ($SO_2$). In the process of this exhaust gas rising inside the scrubber 10, seawater introduced into the scrubber 10 via the seawater pump unit 30 is sprayed so that the gas and the liquid contact.

The sulfur dioxide in the exhaust gas is absorbed and removed by the seawater (alkali), as shown in Expressions (2) and (3).

$$SO_2 + NaHCO_3 \rightarrow NaHSO_3 + CO_2 \uparrow \qquad (2)$$

$$NaHSO_3 + NaHCO_3 + \tfrac{1}{2}O_2 \rightarrow Na_2SO_4 + H_2O + CO_2 \uparrow \qquad (3)$$

And Expressions (4) and (5) show the case when the sulfur dioxide in the exhaust gas is absorbed and removed by sodium hydroxide (NaOH).

$$SO_2 + NaOH \rightarrow NaHSO_3 \qquad (4)$$

$$NaHSO_3 + NaOH + \tfrac{1}{2}O_2 \rightarrow Na_2SO_4 + H_2O \qquad (5)$$

The exhaust gas from which the sulfur dioxide has been removed is exhausted into air through the upper portion of the scrubber 10.

The seawater sprayed inside the scrubber 10 drips down along the inner wall face of the scrubber 10 by its own weight, and is stored in the storage disposed in a lower portion of the scrubber 10 as a liquid reservoir. The stored seawater is drained into the drainage tank 40 via the seawater pump unit 30, is then filtered by the filter unit 50, and drained into the sea.

Figure 2A:
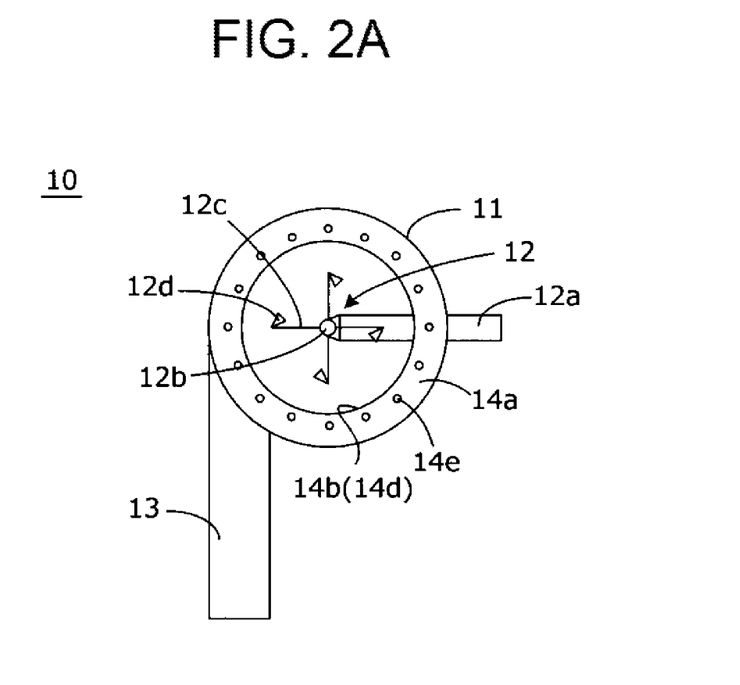
FIG. 2A is a top view of the scrubber.

Now the configuration of the scrubber 10 according to the present embodiment will be described in concrete terms. FIG. 2A is a top view of the scrubber 10 according to the present embodiment, and FIG. 2B is a cross-sectional view of this scrubber 10.

Figure 2B:
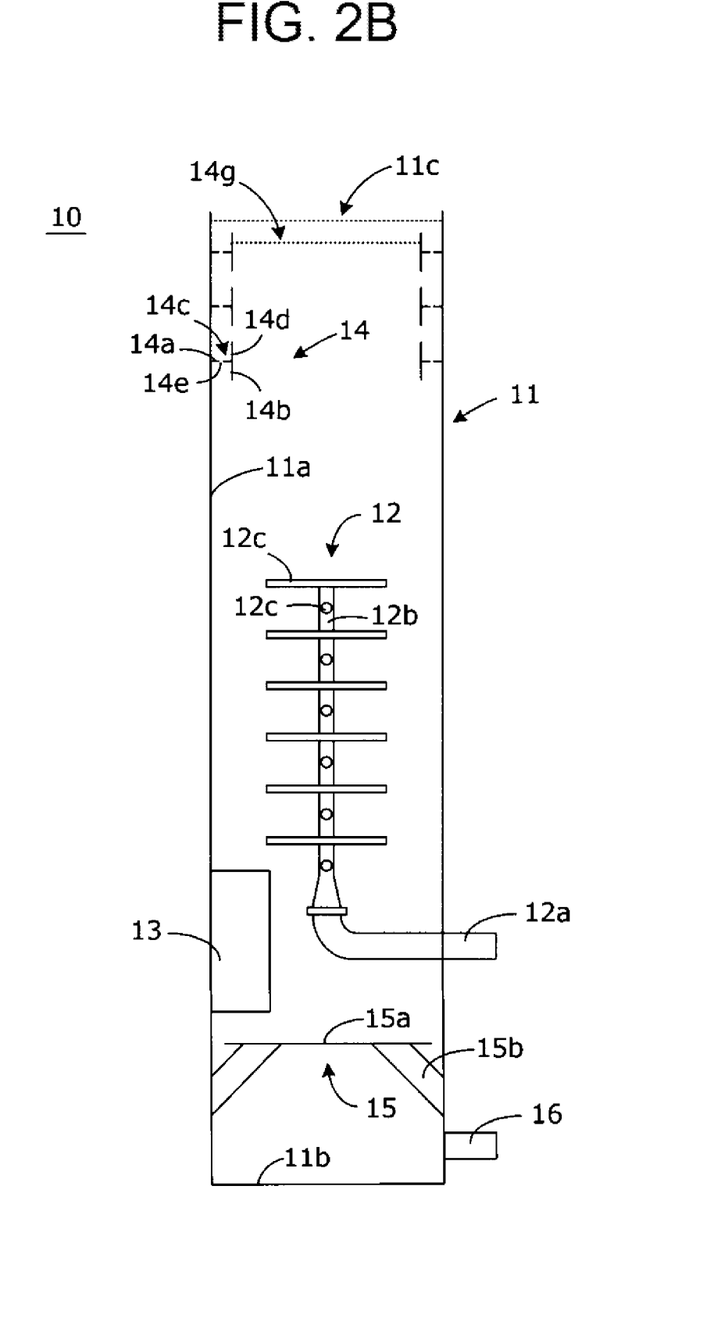
FIG. 2B is a cross-sectional view of the scrubber.

As illustrated in FIG. 2, the scrubber 10 has: an absorption tower main unit 11 in which an internal space is formed in the vertical direction; a spray apparatus 12 that sprays liquid as mist in a predetermined vertical region of the internal space of the absorption tower main unit 11; a gas supply apparatus 13 that introduces gas into the absorption tower main unit 11 from a position lower than the region where the spray apparatus 12 sprays the liquid; a liquid returning member 14 which is disposed in a position higher than the region where the spray apparatus 12 sprays the liquid, and circularly protrudes from the inner wall face of the absorption tower main unit 11 toward the center axis, and of which edge on the center axis side is bent at least downward; and a baffle 15 which is disposed in a position lower than the spray apparatus 12. The spray apparatus 12 is connected to the seawater pump unit 30 shown in FIG. 1, and the gas supply apparatus 13 is connected to the engine 20 shown in FIG. 1.

The absorption tower main unit 11 is constituted by a cylindrical peripheral wall area 11a and a circular base wall area 11b. The peripheral wall area 11a is formed so that the diameter thereof is always the same. The upper end of the peripheral wall area 11a is open, where an opening 11c is formed. In this embodiment the absorption tower main unit 11 is cylindrical, but the shape of the absorption tower main unit 11 is not limited to this, and may be a prism, for example.

The spray apparatus 12 is disposed on the center axis of the absorption tower main unit 11. The spray apparatus 12 includes: a feed pipe 12a which is inserted into the absorption tower main unit 11 from outside the absorption tower main unit 11, and extends to the center position of the absorption tower main unit 11; a conduit 12b which is a main pipe connected to the insertion end of the feed pipe 12a, and extends toward a predetermined vertical region of the internal space of the absorption tower main unit 11; branch pipes 12c which are connected to the conduit 12b, and extend toward the peripheral wall area 11a of the absorption tower main unit 11; and a spray nozzle 12d which is disposed at the tip of each branch pipe 12c, and sprays liquid supplied through the branch pipe 12c in a predetermined range. Each spray nozzle 12d is installed so that the angle formed by the long direction of the branch pipe 12c and the center line of the spray region of the spray nozzle 12d is an acute angle, as described later.

The branch pipes 12c, which are arranged vertically in a plurality of levels, are disposed such that adjacent branch pipes 12c intersect orthogonally in the vertical direction. The arrangement of the branch pipes 12C, with respect to the conduit 12b, is not limited to this, and four branch pipes 12c may be disposed on a same circumference of the conduit 12b at 90° intervals. The material of the spray nozzle 12d is preferably austenite stainless steel material that has corrosion resistance in the case of using seawater as the absorbing solution.

The gas supply apparatus 13 is disposed such that the gas jetting direction is along the tangential direction of the peripheral wall area 11a of the absorption tower main unit 11. Therefore the exhaust gas introduced from the gas supply apparatus 13 is injected in the horizontal direction along the inner circumference surface of the peripheral wall area 11a. The position of the gas supply apparatus 13 is not limited to the position lower than the region where the spray apparatus 12 sprays liquid, as illustrated in FIG. 2B, but may be at a same height as the spray nozzle 12d which is located in a position lower than the spray apparatus 12. In this case, the length of the reaction area can be secured without decreasing the removal rate of the toxic substances in the exhaust gas, therefore the height of the absorption tower main unit 11 can be decreased.

The liquid returning member 14 includes: a turn-back surface area 14a that circularly protrudes from the peripheral wall area 11a of the absorption tower main unit 11 toward the center axis; a bent piece 14b that is bent down from the edge of the turn-back surface area 14a on the center axis side; a liquid collecting wall 14d that protrudes upward from the edge of the turn-back surface area 14a to form a liquid reservoir 14c; and an opening 14e that allows the liquid collected in the liquid reservoir 14c to fall through.

A region on the center axis side surrounded by the bent piece 14b and the liquid collecting wall 14d of the liquid returning member 14 installed in the absorption tower main unit 11 constitutes an opening 14g (see FIG. 2B). This opening 14g is configured to have an inner diameter that is 50% to 80% of the inner diameter of the opening 11c of the absorption tower main unit 11. By this configuration, pressure loss, due to the installing the liquid returning member 14 in the absorption tower main unit 11, can be suppressed.

The baffle 15 is constituted by a disk part 15a and a leg part 15b that connects the disk part 15a to the peripheral wall area 11a of the absorption tower main unit 11. A gap that allows droplets to flow through is formed between the outer periphery of the disk part 15a and the peripheral wall area 11a of the absorption tower main unit 11. The baffle 15 divides the inside of the absorption tower main unit 11 into a region where the spray apparatus 12 sprays liquid and a region where liquid, to be drained from of the absorption tower main unit 11, is stored. A drainage pipe 16, to drain liquid from the absorption tower main unit 11, is disposed in a location below the baffle 15.

Next the exhaust gas treatment in the scrubber 10 configured like this will be described. The exhaust gas discharged from the engine is introduced by the gas supply apparatus 13 to a position lower than the region where the spray apparatus 12 sprays liquid. This exhaust gas rises inside the absorption tower main unit 11 while circling along the peripheral wall area 11a.

Seawater, on the other hand, is introduced into the conduit 12b via the feed pipe 12a. Then the seawater is sprayed from the spray nozzles 12d disposed in the plurality of branch pipes 12c, toward the peripheral wall area 11a of the absorption tower main unit 11.

Therefore the exhaust gas that circles and rises inside the absorption tower main unit 11 contacts with seawater sprayed from the spray nozzle 12d installed in each branch pipe 12c disposed at each level, and the sulfur dioxide in the exhaust gas is absorbed and removed. The exhaust gas, from which the sulfur dioxide has been removed, is exhausted into air through the opening 11c, which is formed in the upper portion of the absorption tower main unit 11.

The sprayed seawater, which becomes droplets, is forced against the peripheral wall area 11a by the centrifugal force due to the circling and rising flow, and drips down by its own weight. However a part of the seawater rises inside the absorption tower main unit 11 by the circling and rising flow.

The gas flow rate of the center portion of the absorption tower main unit 11 is a 0 m/s or neighborhood value thereof, and the gas flow rate is faster in an area near the peripheral wall area 11a compared with the center portion, therefore the seawater rises along the peripheral wall area 11*a* by the centrifugal force. The seawater that rises along the peripheral wall area 11*a* is interrupted by the liquid returning member 14 at the lowest level, and is collected in an area around the lower surface of the turn-back surface area 14*a* and the bent piece 14*b*. If the collected liquid reaches a certain amount, the liquid becomes droplets and drips down by its own weight.

A part of the seawater, however, does not become droplets but rises beyond the bent piece 14*b*, along the inner circumferential surfaces of the bent piece 14*b* and the liquid collecting wall 14*d* of the liquid returning member 14 by the centrifugal force, and rises further along the peripheral wall area 11*a* between a liquid returning member 14 and a liquid returning member 14. The seawater that reaches the liquid returning member 14 at the next level is interrupted by this liquid returning member 14, and is collected in an area around the lower surface of the turn-back surface area 14*a* and the bent piece 14*b*. If the collected liquid reaches a certain amount, the liquid becomes droplets and drips down by its own weight. These droplets are collected in the liquid reservoir 14*c* on the lower level, and the collected liquid that exceeds a certain amount falls into the lower portion of the absorption tower main unit 11 via the opening 14*e*.

The gas flow rate of the area around the peripheral wall area 11*a* of the absorption tower main unit 11 is faster compared with the center portion of the absorption tower main unit 11, which means that if the opening 14*e* is formed near the peripheral wall area 11*a*, the droplets may not fall via the opening 14*e* due to the influence of the ascending current. Therefore the opening 14*e* is formed in a position distant from the peripheral wall area 11*a* where the gas flow rate is slower compared with area near the peripheral wall area 11*a*, whereby the influence of the ascending current is weakened, and droplets are allowed to fall through via the opening 14*e*.

The liquid returning member 14 is disposed in a plurality of levels in the vertical direction, which means that the rise of seawater by the liquid returning member 14 is interrupted a plurality of times. As a result, an out flow of the rising seawater through the opening 11*c* of the absorption tower main unit 11 can be effectively prevented.

Further, even if the liquid returning member 14 is installed in the absorption tower main unit 11, a pressure loss, caused by the installation of the liquid returning member 14, can be lessened since the liquid returning member 14 circularly protrudes from the peripheral wall area 11*a* of the absorption tower main unit 11 toward the center axis, and the opening 14*g* is formed on the center axis side. Moreover, clogging does not occur because of the liquid returning member 14, which makes troublesome maintenance unnecessary.

The droplets that are dripping down stop circling because the baffle 15 is disposed in a lower area of the absorption tower main unit 11, the droplets then fall down along the baffle 15 and the peripheral wall area 11*a*, and are collected in the liquid reservoir constituted by the bottom wall area 11*b* and the peripheral wall area 11*a* of the absorption tower main unit 11. The collected liquid is drained from the absorption tower main unit 11 via the drainage pipe 16.

Figure 3:
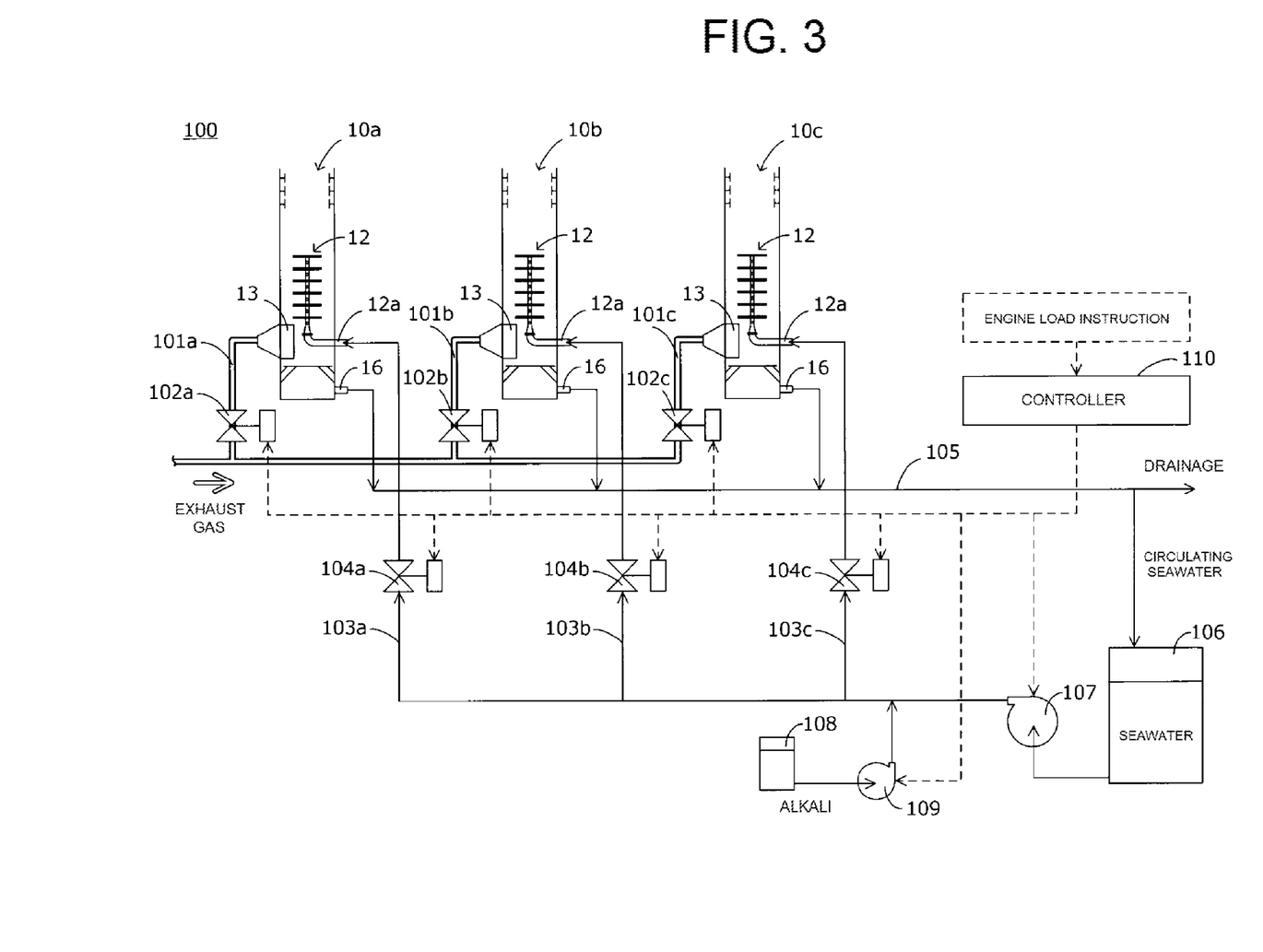
FIG. 3 is a diagram depicting a configuration of an exhaust gas treatment apparatus according to the present embodiment.

Now the configuration of the exhaust gas treatment apparatus according to the present embodiment will be described in concrete terms with reference to FIG. 3. FIG. 3 is a diagram depicting a configuration of the exhaust gas treatment apparatus according to the present embodiment.

As illustrated in FIG. 3, the exhaust gas treatment apparatus 100 is constituted by a plurality of (three in the case of this embodiment) scrubbers 10 (10*a*, 10*b* and 10*c*).

An exhaust gas passage (second passage) 101*a* (101*b*, 101*c*), to introduce exhaust gas into the scrubber 10*a* (10*b*, 10*c*), is connected to the gas supply apparatus 13 of the scrubber 10*a* (10*b*, 10*c*). A switching valve 102*a* (102*b*, 102*c*), to switch the exhaust gas passage 101*a* (101*b*, 101*c*), is disposed in the middle of the exhaust gas passage 101*a* (101*b*, 101*c*).

The switching valve 102 (102*a*, 102*b*, 102*c*) can be configured using a gate valve, a bell value or a butterfly valve. A butterfly valve is particularly desirable for the switching valve 102 (102*a*, 102*b*, 102*c*).

A feed passage (first passage) 103*a* (103*b*, 103*c*), to supply liquid to the spray apparatus 12, is connected to the feed pipe 12*a* of the scrubber 10*a* (10*b*, 10*c*). Seawater from a seawater tank 106 is supplied to the feed passage 103 (103*a*, 103*b*, 103*c*) via a seawater pump 107.

Depending on the sea area where the ship is traveling, the seawater discharged from the scrubber 10 may not be allowed to drain into the sea due to maritime regulations. In this case, the seawater supplied from the scrubber 10 to a later mentioned drainage passage 105 could be stored in the seawater tank 106 as circulation seawater, and used for the exhaust gas treatment again.

In the case of the circulation seawater, however, alkali components in the seawater have been consumed by the scrubber 10 that has absorbed $SO_2$. Therefore the absorption reaction of $SO_2$ in the exhaust gas with the seawater may be interrupted in the repeated exhaust gas treatment, and as a result, $SO_2$ concentration in the treated exhaust gas, which is discharged from the scrubber 10 into air, may exceed the emission control value.

Hence to compensate for the absence of alkali components in the seawater, the feed passage 103 is configured such that alkali agents can be injected from an alkali tank 108 via an alkali pump 109. A sodium hydroxide (NaOH) solution can be used for the alkali agent.

In the middle of the feed passage 103*a* (103*b*, 103*c*), a switching valve 104*a* (104*b*, 104*c*), to switch the feed passage 103*a* (103*b*, 103*c*), is disposed. The switching valve 104 (104*a*, 104*b*, 104*c*) can be configured using a gate valve or a ball valve.

The switching valves 102 and 104 can be configured as a manual type, an electromagnetic or electric type, or a compressed air driven type. It is preferable, however, that the switching valves 102 and 104 are constituted by an electro-magnetic or electric type, or a compressed air driven type, and a compressed air driven type is most desirable in terms of explosion prevention.

The switching of the switching valves 102 and 104 is controlled by a control signal outputted by the controller 110. The controller 110 computes and outputs the control signal based on the engine load instruction value. Because of this configuration, exhaust gas can be treated using all the scrubbers 10 when the engine load is at the maximum, and a number of scrubbers 10 used for the exhaust gas treatment can be decreased as the engine load decreases.

A drainage passage 105 is connected to the drainage pipe 16 of the scrubber 10*a* (10*b*, 10*c*). The seawater discharged from the scrubber 10 to the drainage passage 105 is either drained into the sea or stored in the seawater tank 106 as circulation seawater.

In the exhaust gas treatment apparatus 100, a plurality of scrubbers 10 are installed in parallel, which causes a problem of equi-distribution when exhaust gas is introduced. However about 500 Pa of pressure loss is generated at the gas inlet of the gas supply apparatus 13 of the scrubber 10, therefore no special consideration is required. If the pressure loss of the scrubber 10 is decreased, piping distribution that can implement equi-distribution of the exhaust gas should be appropriately designed.

A plurality of scrubbers 10 are installed in parallel in the exhaust gas treatment apparatus 100, which causes a problem of equi-distribution when an absorbing solution is introduced. However about 0.05 to 0.2 MPa of pressure loss is generated at the absorbing solution inlet of the feed pipe 12a of the scrubber 10, therefore no special consideration is required.

If the scrubber 10 is installed to treat exhaust gas discharged from a ship engine, a combustion engine of a boiler or the like, the relationship between the height and the diameter of the scrubber 10 is designed so that the height becomes 7 m or less, preferably 5 m or less. If the scrubber 10 is installed on the deck of a ship, however, the height can be 10 m or more.

If the $SO_2$ removal rate demanded for the scrubber 10 is 98%, the scrubber 10 should be designed so that the flow rate of the exhaust gas in a standard state (0° C., 1 atm, DRY) becomes 6 m/s or less, preferably 3 m/s or less.

If the $SO_2$ removal rate demanded for the scrubber 10 is 90%, the scrubber 10 should be designed so that the flow rate of the exhaust gas in a standard state (0° C., 1 atm, DRY) becomes 10 m/s or less, preferably 6 m/s or less.

The retention time of the exhaust gas in the absorption tower main unit 11 of the scrubber 10, that is, the retention time of the exhaust gas in an area for the height of the absorbing solution spraying region, to be more precise, should be 0.2 seconds to 2 seconds, preferably 1 second.

The amount of seawater that is supplied from the feed passage 103 to the scrubber 10 should be an amount whereby the spray apparatus 12 can spray 0.5 to 1.5 times the chemical equivalent amount when 1 is the chemical equivalent amount to neutralize sulfur dioxide ($SO_2$) in the exhaust gas to be treated, and preferably an amount whereby the spray apparatus 12 can spray 1.2 times the chemical equivalent amount.

The scrubber 10 is constituted by a material which is resistant to seawater and alkali solutions. For example, low coast iron [e.g. SS400) can be used. Examples of seawater-resistant materials that can be used are: a copper alloy (e.g. naval brass), aluminum alloy (e.g. aluminum brass), a nickel alloy (e.g. cupronickel) and stainless steel (e.g. SUS 316L material).

Now multi-tower control by the exhaust gas treatment apparatus 100, illustrated in FIG. 3, will be described. In the exhaust gas treatment apparatus 100, a number of scrubbers 10 to be operated can be controlled by controlling the switching of the switching valve 102 disposed in the exhaust gas passage 101, and the switching valve 104 disposed in the feed passage 103 according to the engine load rate.

In the multi-tower control in the exhaust gas treatment apparatus 100, the relationship between the engine load rate and a number of scrubbers to be used is shown below. First to set the rated condition, the scrubber 10 is designed based on an 85% engine load, which is a standard maximum value.

In this scrubber 10, if the engine load rate becomes 85% to 100% (overload operation), the flow rate of the absorbing solution to be supplied to the scrubber 10 or the amount of alkali added to the seawater is increased more than the rated condition, so as to handle this state.

If the engine load rate is 0% to 30% or preferably 0% to 15%, it is controlled such that a number of scrubbers 10 in operation becomes one. If the engine load rate is 10% to 70% or preferably 10% to 55%, it is controlled such that a number of scrubbers 10 in operation becomes two. And if the engine load rate is 40 to 100% or preferably 50% to 100%, it is controlled such that a number of scrubbers 10 in operation becomes three.

Figure 4:
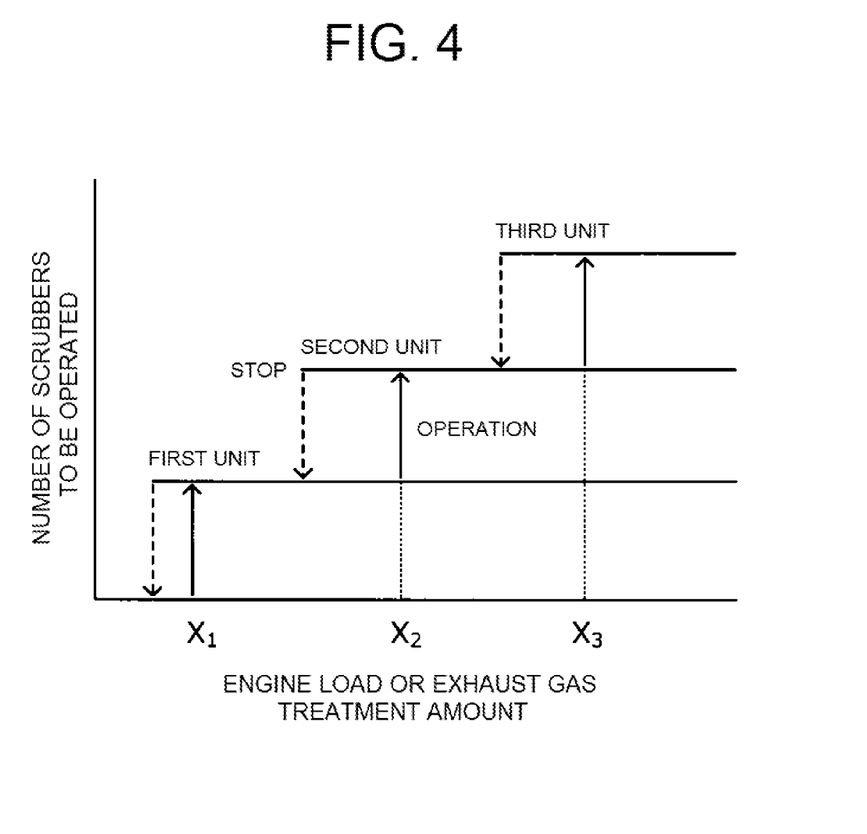
FIG. 4 is a graph depicting a relationship between the number of scrubbers to be operated and an engine load or amount of exhaust gas to be treated.

FIG. 4 is a graph depicting a relationship between the number of scrubbers to be operated and an engine load or amount of exhaust gas to be treated. In FIG. 4, the solid line indicates the operating state of the scrubber 10, and the broken line indicates the stopping state of the scrubber 10.

As shown in FIG. 4, only one scrubber 10 is in operation while the engine load or the exhaust gas treatment amount is ($X_1$) to ($X_2$), and if the engine load or the amount of exhaust gas being treated exceeds ($X_2$), the second scrubber 10 also starts operation. If the engine load or the exhaust gas treatment amount exceeds ($X_3$), the third scrubber 10 also starts operation. If the engine load or the exhaust gas treatment amount decreases from ($X_3$), the third scrubber 10 stops operation, and the engine load or the exhaust gas amount decreases from ($X_2$), and the second scrubber 10 also stops operation.

Figure 5:
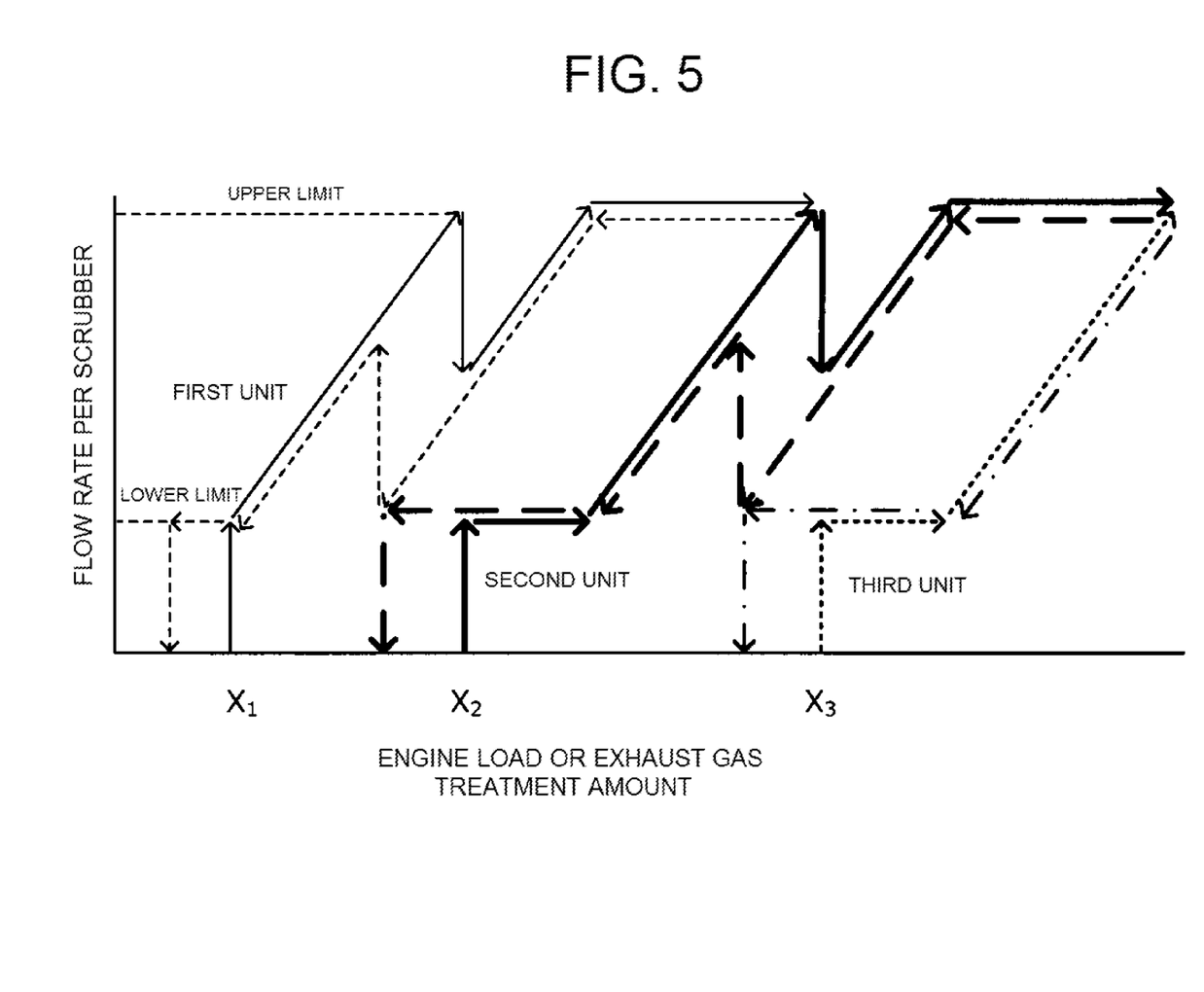
FIG. 5 is a graph depicting a relationship between a flow rate per scrubber and an engine load or amount of exhaust gas treated.

FIG. 5 is a graph depicting a relationship between the flow rate per scrubber and an engine load or amount of exhaust gas being treated. In FIG. 5, the solid line indicates the operating state of the scrubber 10, and the broken line indicates the stopping state of the scrubber 10.

As shown in FIG. 5, only one scrubber 10 is in operation, while the engine load or the exhaust gas treatment amount is ($X_1$) to ($X_2$), and as the engine load or the exhaust gas treatment amount increases from ($X_1$) to ($X_2$), the flow rate of the first scrubber 10a increases accordingly. If the engine load or the amount of exhaust gas being treated exceeds ($X_2$), the second scrubber 10b also starts to be operated. At this time, as the second scrubber 10b to be operated, the flow rate of the first scrubber 10a decreases. Thereby exceeding the capacity of the first scrubber 10a and wasting the absorbing solution and power, generating unnecessary expenses, can be prevented.

As the engine load or the amount of exhaust gas being treated increases from ($X_2$) to ($X_3$), the flow rate of the first scrubber 10a and the second scrubber 10b also increases. More specifically, the flow rate of the first scrubber 10a is increased by the controller 110 to the upper limit value, thereafter the flow rate of the second scrubber 10b is similarly increased.

If the engine load or the exhaust gas treatment amount exceeds ($X_3$), the third scrubber 10c also starts operation. At this time, as the third scrubber 10c operates, the flow rate of the second scrubber 10b decreases. As the engine load or the amount of exhaust gas to be treated increases to more than ($X_3$), the flow rates of the second scrubber 10b and the third scrubber 10c increase accordingly. More specifically, the flow rate of the second scrubber 10b is increased by the controller 110 until it reaches the upper limit value, and thereafter the flow rate of the third scrubber 10c is similarly increased. When the amount of exhaust gas to be treated reaches the maximum value that the exhaust gas treatment apparatus can treat, the flow rate of the third scrubber 10c reaches the maximum.

A case when the amount of exhaust gas being treated decreases from the maximum value will now be described. As the engine load or the amount of exhaust gas being treated decreases toward ($X_3$), the flow rate of the second scrubber 10b and the third scrubber 10c decrease accordingly. More specifically, the flow rate of the third scrubber 10c is decreased until the lower limit value by the controller 110, thereafter the flow rate of the second scrubber 10b is decreased by the controller 110. If the engine load or the amount of exhaust gas being treated further decrease from ($X_3$), the third scrubber 10c stops operation. As the third scrubber 10c stops operation, the flow rate of the second scrubber 10b increases.

As the engine load or the amount of exhaust gas being treated decreases toward ($X_2$), the flow rate of the first scrubber 10a and the second scrubber 10b decrease accordingly. More specifically, the flow rate of the second scrubber 10b is decreased until the lower limit value by the controller 110, thereafter the flow rate of the first scrubber 10a is decreased by the controller 110. If the engine load or the amount of exhaust gas being treated further decreases from ($X_2$), the second scrubber 10b stops operation. And as the second scrubber 10b stops operation, the flow rate of the first scrubber 10a increases.

As described above, according to the exhaust gas treatment apparatus of the present embodiment, a plurality of scrubbers 10 are installed, and the exhaust gas to be treated is distributed to the plurality of scrubbers 10, so that the removal rate of the toxic substances in the exhaust gas can be increased in the entire exhaust gas treatment apparatus 100, while keeping the diameter of each scrubber to a predetermined value or less. Because of the diameter of each scrubber is a predetermined value or less, splashing of the absorbing solution can be suppressed. In this embodiment, a number of scrubbers 10 in operation are controlled based on the engine load or the amount of exhaust gas being treated. However the present invention is not limited to this embodiment. For example, the amount of the seawater sprayed by the spray apparatus 12, instead of a number of scrubbers 10 in operation, may be controlled based on the engine load or the amount of exhaust gas being treated. Alternatively, both a number of scrubbers 10 in operation and the amount of the seawater sprayed by the spray apparatus 12 may be controlled, based on the engine load or the amount of exhaust gas being treated.

Further, the installation locations of the scrubbers 10 in the exhaust gas treatment apparatus 100 can be distributed, hence the exhaust gas treatment apparatus can be installed in a location that is subject to limited installation space, such as an engine room or on the deck of a ship, and installability of the exhaust gas treatment apparatus can be improved.

Moreover, the liquid to be supplied to the spray apparatus 12 of the scrubber 10 and the gas to be introduced to the scrubber 10 can be controlled by controlling the switching of the switching valves 102 and 104, therefore a number of scrubbers 10 in operation can be changed depending on the combustion devices that generate exhaust gas and the changes in the engine load. In other words, a number of scrubbers 10 in operation can be adjusted according to the amount of the exhaust gas to be treated, hence an energy saving operation, without waste, is implemented.

Furthermore, a number of scrubbers 10 in operation and the amount of the absorbing solution can be controlled according to changes in the engine load or the like, hence appropriate spray properties can be maintained.

According to the scrubber 10 of this embodiment, the height of the absorption tower main unit 11 can be lowered, which allows the scrubber 10 to be installed in an engine room or on the deck of a ship, hence installability of the scrubber 10 as the exhaust gas treatment apparatus is improved.

Moreover, as the scrubber 10 becomes smaller, a number of members used for the scrubber 10 can be decreased, which lowers the price of the scrubber 10. Further, the pump power and maintenance costs can be reduced by using a hollow conical nozzle as the spray nozzle 12d, which further implements price reduction.

The present invention is not limited to the embodiments, but numerous modifications can be made. In the embodiments, the size and shape illustrated in the accompanying drawings are not limited to these, but may be modified appropriately within a scope in which the effect of the present invention is demonstrated. The present invention may be appropriately modified without departing from the scope of the objects of the present invention.

What is claimed is:

1. An exhaust gas treatment apparatus that processes gas by bringing liquid into contact with it, comprising:
   a plurality of scrubbers that include an absorption tower main unit, a spray apparatus that sprays liquid in the absorption tower main unit, and a gas supply apparatus that supplies the gas to be processed into the absorption tower main unit;
   a plurality of first passages that branch from a pipe supplying said liquid to the treatment apparatus, and that is connected to the spray apparatus of each of the plurality of scrubbers; and
   a plurality of second passages that branch from a pipe supplying said gas to the treatment apparatus, and that is connected to the gas supply apparatus of each of the plurality of scrubbers.

2. The exhaust gas treatment apparatus according to claim 1, wherein a switching valve is disposed in each of the plurality of first passages and the plurality of second passages,
   the treatment apparatus further comprising a controller that controls switching of the switching valves.

3. The exhaust gas treatment apparatus according to claim 2, wherein the gas in an exhaust gas from an engine and the controller controls a total number of scrubbers to be operated by controlling switching of the switching valves, said total number being determined based on an engine load instruction.

4. The exhaust gas treatment apparatus according to claim 3, wherein the controller controls an amount of the liquid being sprayed in the plurality of scrubbers based on at least one of a load factor of the engine and an amount of the exhaust gas to be processed.

5. The exhaust gas treatment apparatus according to claim 4, wherein the controller implements control so as to
   increase a total number of the scrubbers to be operated when at least one of the load factor of the engine and the amount of the exhaust gas to be processed increases, and
   decrease a total number of scrubbers in operation when at least one of the load factor of the engine and the amount of the exhaust gas to be processed decreases.

6. The exhaust gas treatment apparatus according to claim 5, wherein when the controller increases the total number of the scrubbers to be operated, the controller decreases a flow rate of the gas being supplied to at least one of the scrubbers in operation.

7. The exhaust gas treatment apparatus according to claim 5, wherein when the controller decreases the total number of the scrubbers in operation, the controller increases the flow rate of the exhaust gas being supplied to at least one of the scrubbers that continue operating thereafter.

8. The exhaust gas treatment apparatus according to claim 3, wherein the controller controls the flow rate of the exhaust gas being supplied to one predetermined scrubber among the scrubbers which are in operation.

9. The exhaust gas treatment apparatus according to claim 6,
wherein when a flow rate of exhaust gas being supplied to a first scrubber under flow control reaches an upper limit value, the controller sets a flow rate of exhaust gas to be supplied to a second scrubber to a predetermined set value and starts operation of said second scrubber, and decreases the flow rate of the exhaust gas being supplied to said first scrubbers by said predetermined set value, and
wherein when the flow rate of the exhaust gas being supplied to said first scrubber reaches the upper limit value again, the controller starts controlling the flow rate of the exhaust gas being supplied to said second scrubber.

10. The exhaust gas treatment apparatus according to claim 7, wherein
when a flow rate of exhaust gas being supplied to a first scrubber under flow control reaches a lower limit value of the flow rate, the controller keeps the flow rate of the exhaust gas of the first scrubber to said lower limit value and starts controlling a flow rate of exhaust gas being supplied to a third scrubber in operation, and
when the flow rate of the exhaust gas being supplied to the third scrubber reaches the lower limit value, the controller stops operation of one of the scrubbers in operation at the lower limit value, and increases the flow rate of the exhaust gas being supplied to the other scrubber in operation by the lower limit value.

11. The exhaust gas treatment apparatus according to claim 10, wherein
the absorption tower main unit has a peripheral wall,
a liquid returning member is disposed on the peripheral wall, and
the liquid returning member includes a turn-back surface area that circularly protrudes from the peripheral wall toward a center axis, a bent piece that is bent down from an edge of the turn-back surface area on the center axis side, a liquid collecting wall that protrudes upward from the edge of the turn-back surface area to form a liquid reservoir, and an opening that allows the liquid collected in the liquid reservoir to fall through.

12. The exhaust gas treatment apparatus according to claim 11, wherein the opening is disposed in a position where a velocity of the exhaust gas is slower, compared with an area near the peripheral wall area.

13. The exhaust gas treatment apparatus according to claim 3, wherein the liquid is seawater, the exhaust gas treatment apparatus further comprising:
a seawater tank that stores the seawater that is in contact with the exhaust gas as circulating seawater; and
an alkali pump that supplies an alkali agent to the circulating seawater which is supplied from the seawater tank to the spray apparatus.

14. The exhaust gas treatment apparatus according to claim 1, wherein an internal space is formed in the absorption tower main unit, and the spray apparatus sprays the liquid in a predetermined vertical region of the internal space.

15. A ship comprising an exhaust gas treatment apparatus for treating exhaust gas from a ship engine, and that processes the exhaust gas by bringing liquid into contact therewith, the apparatus including:
a plurality of scrubbers that each include an absorption tower main unit, a spray apparatus that sprays the liquid in the absorption tower main unit, and a gas supply apparatus that supplies the exhaust gas into the absorption tower main unit;
a plurality of first passages that branch from a pipe supplying said liquid to the exhaust gas treatment apparatus, and that is connected to the spray apparatus of each of the plurality of scrubbers; and
a plurality of second passages that branch from a pipe supplying said exhaust gas to the exhaust gas treatment apparatus, and that is connected to the gas supply apparatus of each of the plurality of scrubbers.

16. An exhaust gas treatment method, the method comprising the steps of:
distributing exhaust gas to a plurality of scrubbers;
distributing liquid to the plurality of scrubbers;
controlling operation of the plurality of scrubbers by controlling a total number of scrubbers to be operated among the plurality of scrubbers, the total number being determined based on an engine load instruction; and
a step of removing toxic substances in the exhaust gas by bringing the exhaust gas and the liquid into contact with each other, said exhaust gas and said liquid being supplied to the plurality of scrubbers respectively.

17. The exhaust gas treatment method according to claim 16, wherein
said distributing the exhaust gas includes distributing the exhaust gas to the plurality of scrubbers through a plurality of first passages disposed to each of the plurality of scrubbers,
said distributing the liquid includes distributing the liquid to the plurality of scrubbers through a plurality of second passages respectively connected each of the plurality of scrubbers, and
said controlling the total number of scrubbers includes controlling switching of switching valves each of which is disposed in each of the first passage and the second passage.

18. The exhaust gas treatment method according to claim 17, wherein the controlling switching of the switching valves includes controlling a total number of scrubbers to be operated by controlling switching of the switching valves based on the engine load instruction.

19. The exhaust gas treatment method according to claim 18, wherein the controlling the total number of scrubbers includes controlling an amount of spray of the liquid to be supplied in the plurality of scrubbers according to at least one of a load factor of the engine and an amount of exhaust gas included in an exhaust gas stream.

20. The exhaust gas treatment method according to claim 19, wherein the controlling the total number of scrubbers includes:
increasing a total number of scrubbers to be operated when at least one of the load factor of the engine and the amount of exhaust gas included in an exhaust gas stream to be processed increases, and
decreasing a total number of scrubbers in operation when at least one of the load factor of the engine and the amount of the exhaust gas included in the exhaust gas stream decreases.

* * * * *